(12) United States Patent
Chao et al.

(10) Patent No.: US 12,504,646 B2
(45) Date of Patent: Dec. 23, 2025

(54) EYEGLASSES HAVING TEMPLES BENDABLE TO CONVERT BETWEEN TWO DIFFERENT CURVED STATES

(71) Applicant: CONTOUR OPTIK INC., Minxiong Township, Chiayi County (TW)

(72) Inventors: David Chao, Saratoga, CA (US); Chien-Ho Lin, Minxiong Township, Chiayi County (TW); Chien-Liang Yeh, Minxiong Township, Chiayi County (TW)

(73) Assignee: CONTOUR OPTIK INC., Minxiong Township (TW)

( * ) Notice: Subject to any disclaimer, the term of this patent is extended or adjusted under 35 U.S.C. 154(b) by 399 days.

(21) Appl. No.: 18/149,614

(22) Filed: Jan. 3, 2023

(65) Prior Publication Data

US 2024/0085721 A1 Mar. 14, 2024

(30) Foreign Application Priority Data

Sep. 14, 2022 (CN) .......................... 202222426589.4

(51) Int. Cl.
*G02C 3/00* (2006.01)
*G02C 5/00* (2006.01)
(Continued)

(52) U.S. Cl.
CPC ............. *G02C 3/003* (2013.01); *G02C 5/008* (2013.01); *G02C 5/143* (2013.01); *G02C 5/16* (2013.01)

(58) Field of Classification Search
CPC .................................. G02C 5/16; G02C 5/143
See application file for complete search history.

(56) References Cited

U.S. PATENT DOCUMENTS

| 4,684,226 A | * | 8/1987 | Anger | ...................... | G02C 5/16 351/123 |
| 4,730,916 A | * | 3/1988 | Liautaud | .................. | G02C 5/16 351/123 |

(Continued)

FOREIGN PATENT DOCUMENTS

| GB | 2548093 A | * | 9/2017 | ............. G02C 11/00 |
| JP | 3109391 U | * | 5/2005 | |

(Continued)

OTHER PUBLICATIONS

Machine translation of KR-20170083242-A retrieved electronically from PE2E Search May 2, 2025 (Year: 2025).*

(Continued)

*Primary Examiner* — Cara E Rakowski
(74) *Attorney, Agent, or Firm* — HSML P.C.

(57) ABSTRACT

The eyeglasses includes a glasses frame and two temples. The glasses frame has two opposite ends. Each of the two temples has a front end connected pivotally to a respective one of the two opposite ends of the glasses frame. Each of the two temples have a section that is flexible so that, by applying lateral forces to the two temples, the temples are convertible between an outwardly curved state where rear ends of the two temples are spaced apart from each other at a first distance, and an inwardly curved state where the rear ends of the two temples are spaced apart from each other at a second distance that is smaller than the first distance.

9 Claims, 22 Drawing Sheets

(51) Int. Cl.
*G02C 5/14* (2006.01)
*G02C 5/16* (2006.01)

(56) References Cited

U.S. PATENT DOCUMENTS

| | | | | |
|---|---|---|---|---|
| 5,666,181 | A * | 9/1997 | Conway | G02C 5/2254 |
| | | | | 351/111 |
| 6,758,562 | B1 * | 7/2004 | Barnette | G02C 5/16 |
| | | | | 351/114 |
| 7,452,071 | B2 * | 11/2008 | Daems | G02C 5/00 |
| | | | | 351/111 |
| 2013/0229614 | A1 * | 9/2013 | Marini | G02C 5/146 |
| | | | | 351/114 |
| 2014/0002787 | A1 * | 1/2014 | Huang | G02C 5/16 |
| | | | | 351/113 |
| 2014/0132911 | A1 * | 5/2014 | Yoshida | G02C 5/143 |
| | | | | 29/20 |
| 2020/0400970 | A1 * | 12/2020 | Vogel | G02C 5/20 |

FOREIGN PATENT DOCUMENTS

| | | | |
|---|---|---|---|
| KR | 20170083242 A | * | 7/2017 |
| WO | WO-2018096989 A1 | * | 5/2018 |
| WO | WO-2021095272 A1 | * | 5/2021 |

OTHER PUBLICATIONS

Machine translation of WO-2018096989-A1 retrieved electronically from PE2E Search May 2, 2025 (Year: 2025).*
Machine translation of WO-2021095272-A1 retrieved electronically from PE2E Search May 2, 2025 (Year: 2025).*
Machine translation of JP 3109391 U retrieved electronically from PE2E Search Sep. 12, 2025 (Year: 2005).*

* cited by examiner

EYEGLASSES HAVING TEMPLES BENDABLE TO CONVERT BETWEEN TWO DIFFERENT CURVED STATES

CROSS-REFERENCE TO RELATED APPLICATION

This application claims priority to Chinese Utility Model Patent Application No. 202222426589.4, filed on 14$^{th}$ of Sep. 2022.

FIELD

The disclosure relates to a pair of eyeglasses, and more particularly to a pair of eyeglasses having flexible temples that can be bent to convert between two different curved states.

BACKGROUND

Users of eyeglasses have diverse head and face shapes that a conventional pair of eyeglasses may not account for, thereby causing some users to experience the conventional eyeglasses sliding or falling off the user's face. In these situations, the user must manually adjust the conventional eyeglasses which is somewhat inconvenient and needs improvements to be made to the conventional eyeglasses.

SUMMARY

Therefore, an object of the disclosure is to provide a pair of eyeglasses with flexible temples that can alleviate at least one of the drawbacks of the prior art.

According to the disclosure the flexible eyeglasses includes a glasses frame and two temples. The glasses frame has two opposite ends. Each of the two temples has a front end connected pivotally to a respective one of the two opposite ends of the glasses frame. Each of the two temples have a section that is flexible so that, by applying lateral forces to the two temples, the temples are convertible between an outwardly curved state where rear ends of the two temples are spaced apart from each other at a first distance, and an inwardly curved state where the rear ends of the two temples are spaced apart from each other at a second distance that is smaller than the first distance.

BRIEF DESCRIPTION OF THE DRAWINGS

Other features and advantages of the disclosure will become apparent in the following detailed description of the embodiments with reference to the accompanying drawings. It is noted that various features may not be drawn to scale.

DETAILED DESCRIPTION

Figure 1:
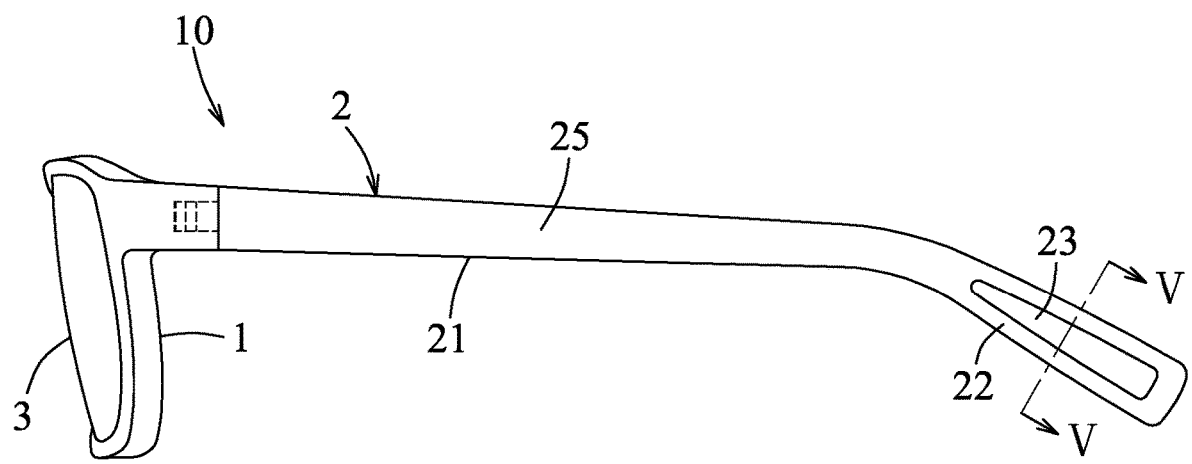
FIG. 1 is a schematic side view illustrating a first embodiment of a pair of eyeglasses according to the present disclosure.
Figure 2:
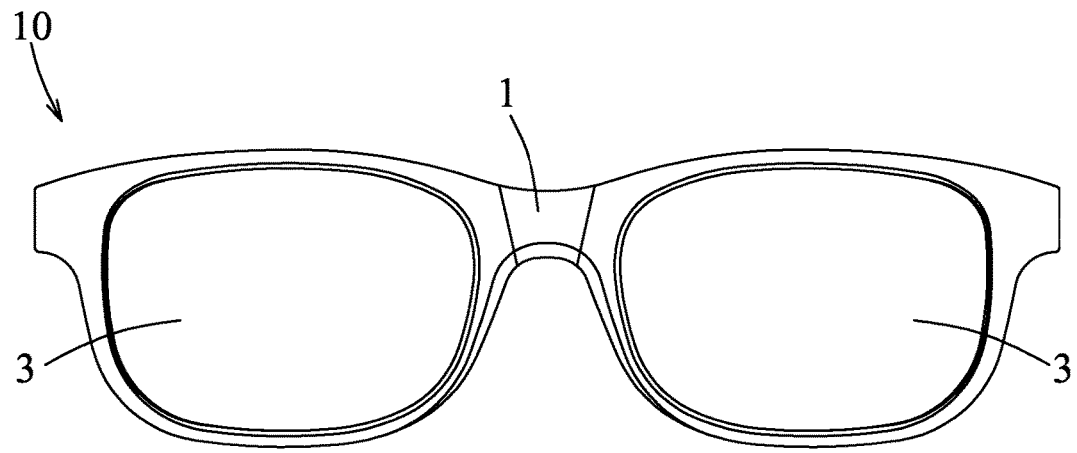
FIG. 2 is a frontal view illustrating the first embodiment.
Figure 3:
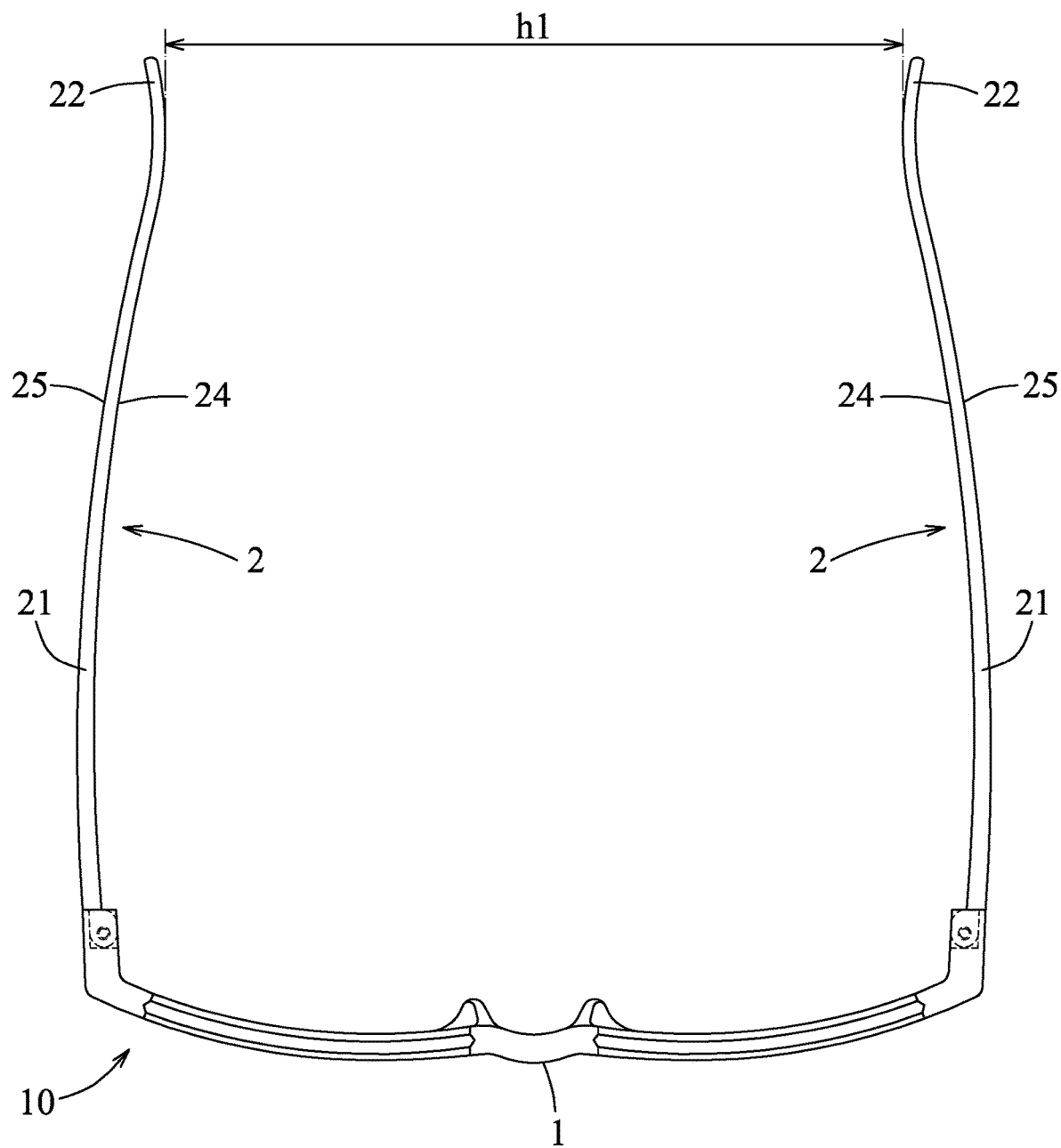
FIG. 3 is a schematic top view illustrating two temples of the eyeglasses in an outwardly curved state.
Figure 4:
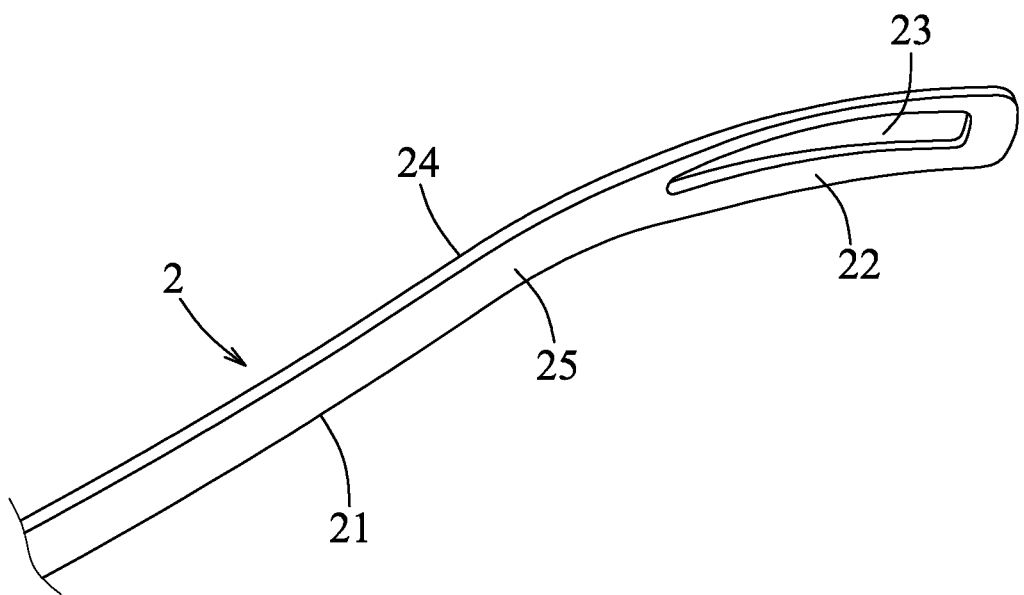
FIG. 4 is a fragmentary enlarged perspective view illustrating one of the two temples in an outwardly curved state.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 5:
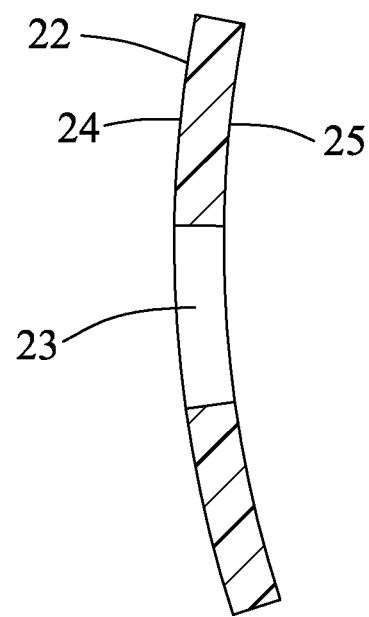
FIG. 5 is a fragmentary cross-sectional view taken from line V-V in FIG. 1 showing one of the two temples in an outwardly curved state.
Figure 6:
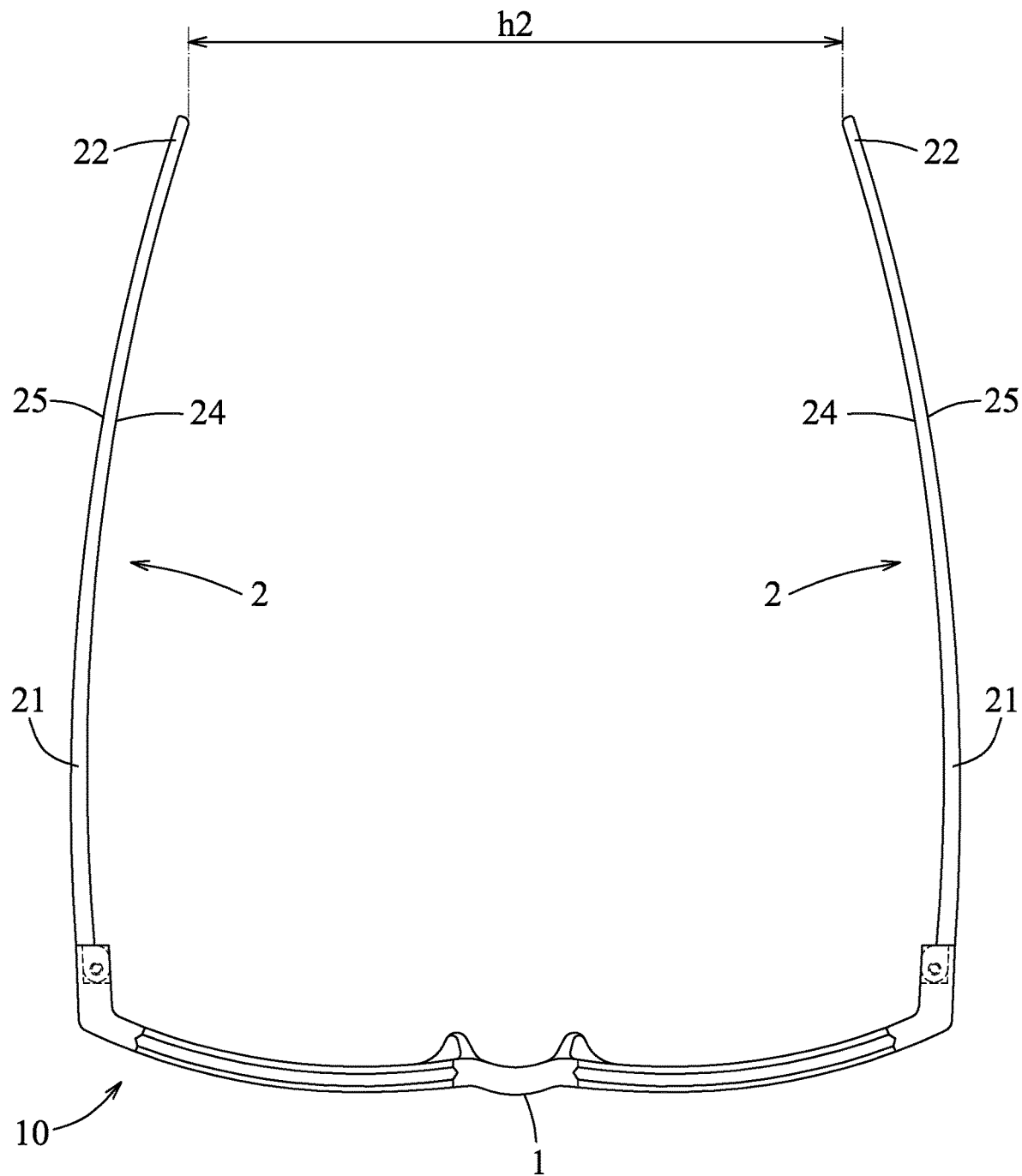
FIG. 6 is a schematic top view illustrating the two temples of the first embodiment in an inwardly curved state.
Figure 7:
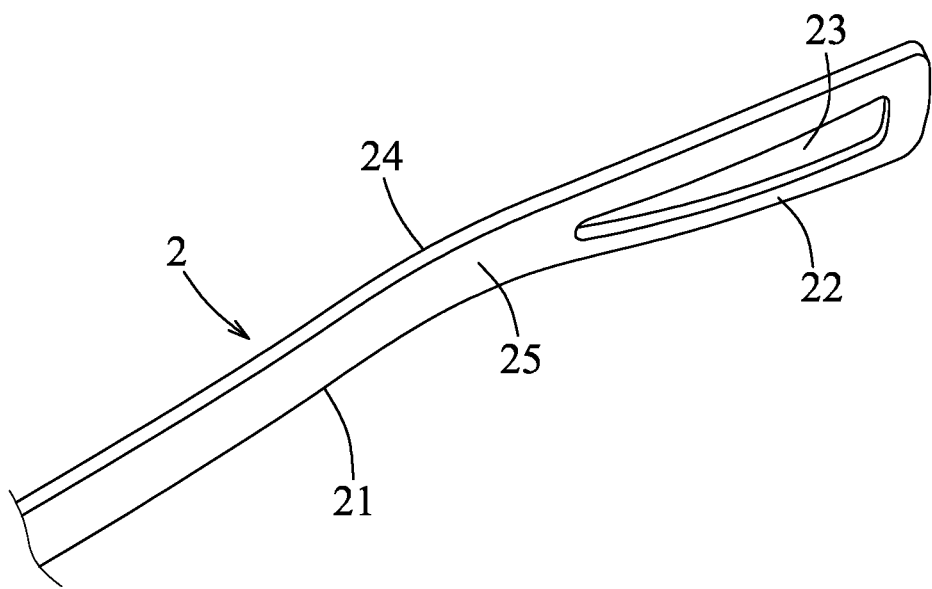
FIG. 7 is a fragmentary enlarged perspective view illustrating one of the two temples in an inwardly curved state.
Figure 8:
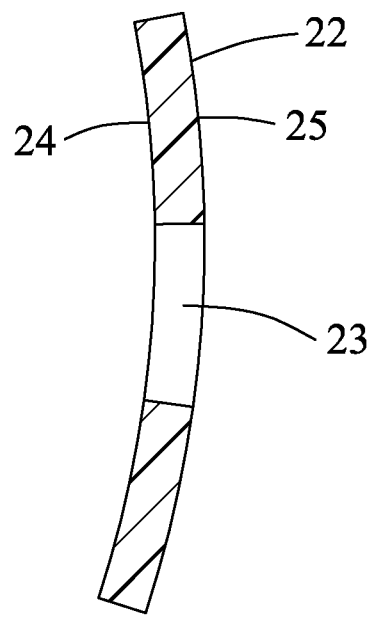
FIG. 8 is a fragmentary cross-sectional view similar to FIG. 5 showing one of the two temples in an inwardly curved state.

Referring to FIGS. 1 to 4 and FIG. 6, in which a first embodiment of a pair of eyeglasses 10 according to the present disclosure is shown. The pair of eyeglasses 10 includes a glasses frame 1, two temples 2, and two lenses 3. The glasses frame 1 has two opposite ends. The two lenses 3 are both mounted on the glasses frame 1. Each temple 2 has a front end that is connected pivotally to a respective one of the two opposite ends of the glasses frame 1. More specifically, each of the two temples 2 has a horizontal portion 21 that has the front end, and that is connected to the glasses frame 1, and that extends rearwardly from the glasses frame 1, and a temple tip portion 22 that is connected to the horizontal portion 21 and that extends rearwardly from a rear end of the horizontal portion 21. It should be noted that in this embodiment the temple tip portion 22 is connected inclinedly to the horizontal portion 21 and that extends rearwardly and downwardly from the rear end of the horizontal portion 21. However, this is not a limitation of the disclosure, and in other embodiments the temple tips may extend straight and be co-linear with each other, or in some embodiments they may be connected inclinedly to the horizontal portion 21 but extend rearwardly and upwardly. Additionally, it should be noted that the horizontal portion 21 of each temple 2 is slightly curved to reduce pressure on a wearer's head when the eyeglasses 10 are worn, and that the temple tip portion 22 is also slightly curved to further reduce pressure on the wearer. Each of the two temples 2 has at least one opening 23 that is formed in the temple tip portion 22. In this embodiment, each of the two temples 2 has one elongated opening 23 that is formed in the temple tip portion 22, an inner side surface 24, and an outer side surface 25 opposite to the inner side surface 24. Each of the two temples 2 have a section that is flexible so that, by applying slight lateral forces to the two temples 2, the temples 2 are convertible between an outwardly curved state where rear ends of the two temples 2 are spaced apart from each other at a first distance (h1) (see FIG. 3), and an inwardly curved state where the rear ends of the two temples 2 are spaced apart from each other at a second distance (h2) (see FIG. 6) that is smaller than the first distance (h1). Referring to FIGS. 5 and 8, more specifically, when the two temples are in the outwardly curved state, for each of the two temples 2, the inner side surface 24 is curved towards the outer side surface 25, and when the two temples 2 are in the inwardly curved state, for each of the two temples 2, the outer side surface 25 is curved toward the inner side surface 24. The two temples 2 are made of one of a metal material and a unitary plastic material; however, this is not a limitation of the disclosure. In other embodiments, the two temples 2 may be made of various flexible materials so as to provide flexibility for converting between the inwardly curved state and the outwardly curved state, or the two temples 2 may have a variable thickness to facilitate conversion. In still other embodiments, each of the two temples 2 may only have one section that is made of a flexible material, or the section may have a thickness different from the rest of the corresponding temple 2.

By virtue of the first distance (h1), which occurs when the two temples 2 are in the outwardly curved state, being greater than the second distance (h2), which occurs when the two temples 2 are in the inwardly curved state, a user of the eyeglasses 10 can put on the eyeglasses 10 with the two temples 2 in the outwardly curved state, and then manually tap the rear ends of the two temples 2 to convert them into the inwardly curved state so that the two temples 2 better conform to the shape of the user's head. Therefore, situations such as the eyeglasses 10 sliding off the user's face or wobbling while being worn can be prevented, and the eyeglasses 10 may be worn more stably.

Figure 9:
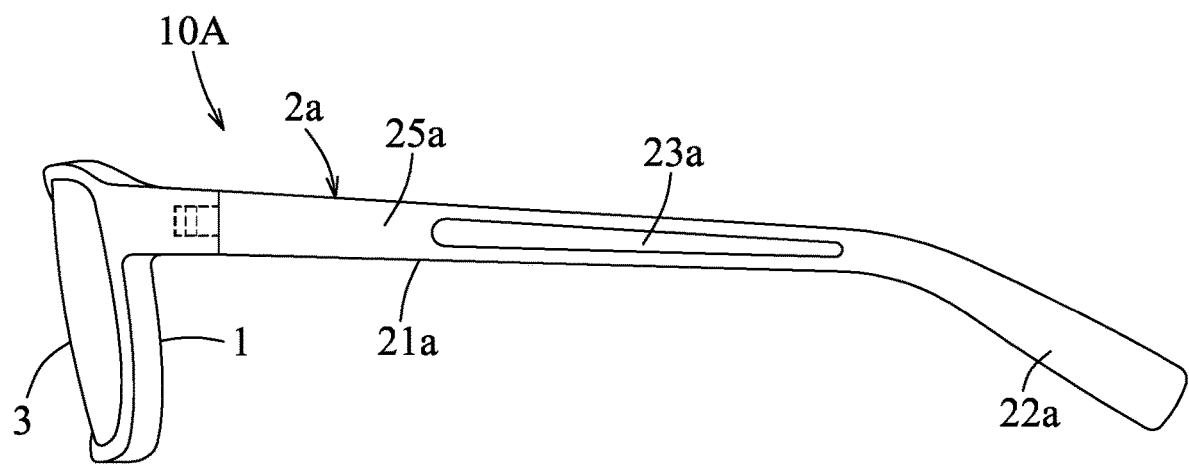
FIG. 9 is a schematic side view illustrating a second embodiment of the eyeglasses according to the present disclosure.
Figure 10:
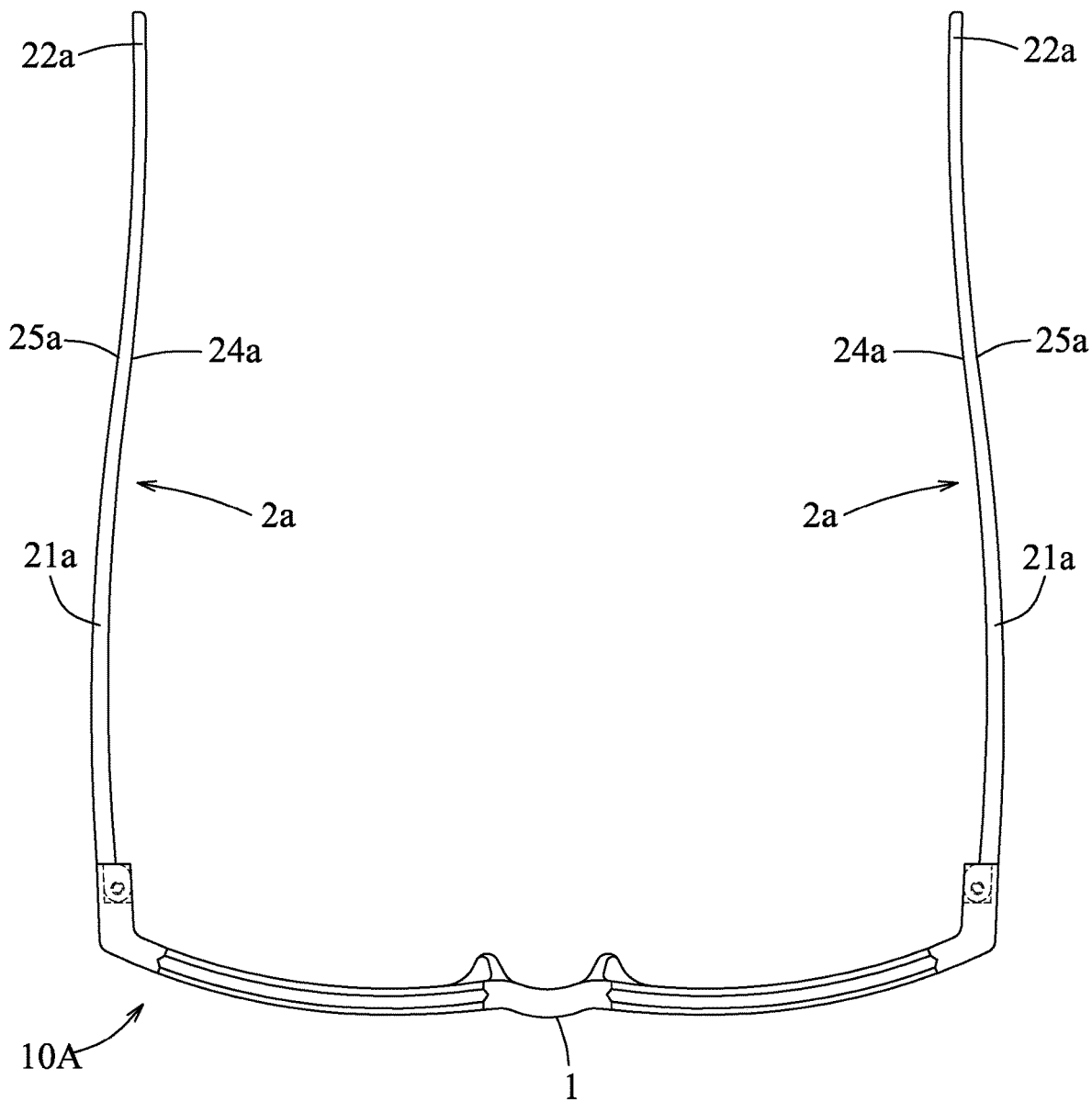
FIG. 10 is a schematic top view of the second embodiment, illustrating that the two temples are in an outwardly curved state.
Figure 11:
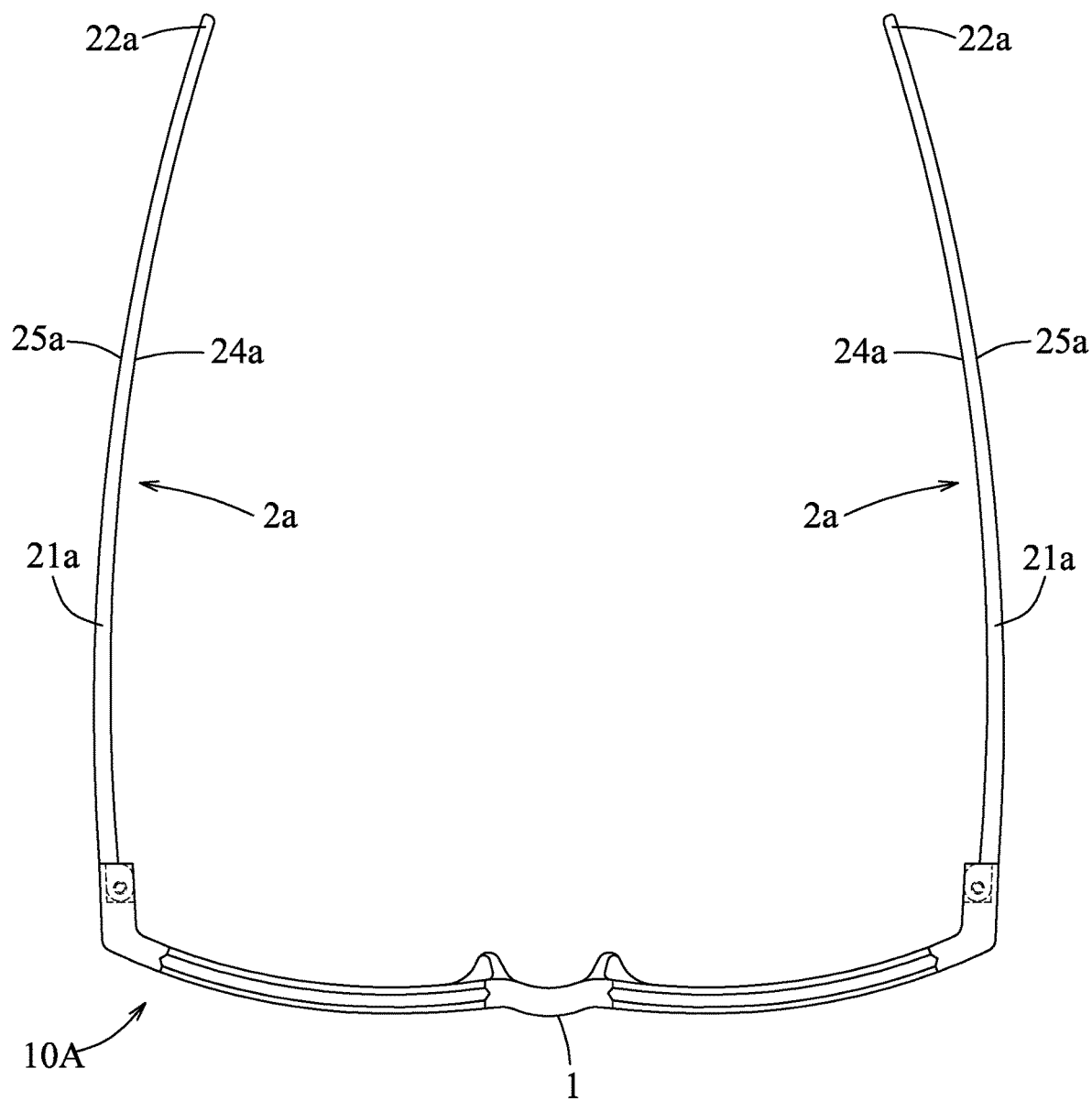
FIG. 11 is a schematic top view of the second embodiment, illustrating that the two temples are in an inwardly curved state.

Referring to FIGS. 9 to 11, in which a second embodiment of the eyeglasses 10A is shown. The second embodiment is similar to the first embodiment in that the second embodiment includes a glasses frame 1, two temples 2a, and two lenses 3. Each of the two temples 2a has a horizontal portion 21a, a temple tip portion 22a, an opening 23a, an inner side surface 24a, and an outer side surface 25a opposite to the inner side surface 24a. The second embodiment is different from the first embodiment in that the openings 23a of the two temples 2a are formed respectively in the horizontal portions 21a thereof. Therefore, the horizontal portion 21 is bendable manually to convert between an outwardly curved structure and an inwardly curved structure, and the second embodiment has the same function as the first embodiment.

Figure 12:
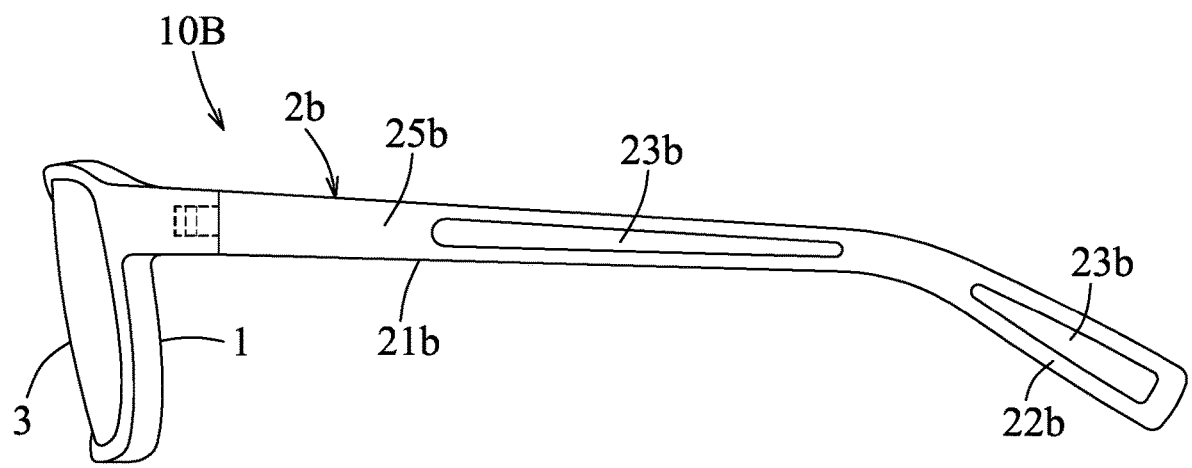
FIG. 12 is a schematic side view illustrating a third embodiment of the eyeglasses.
Figure 13:
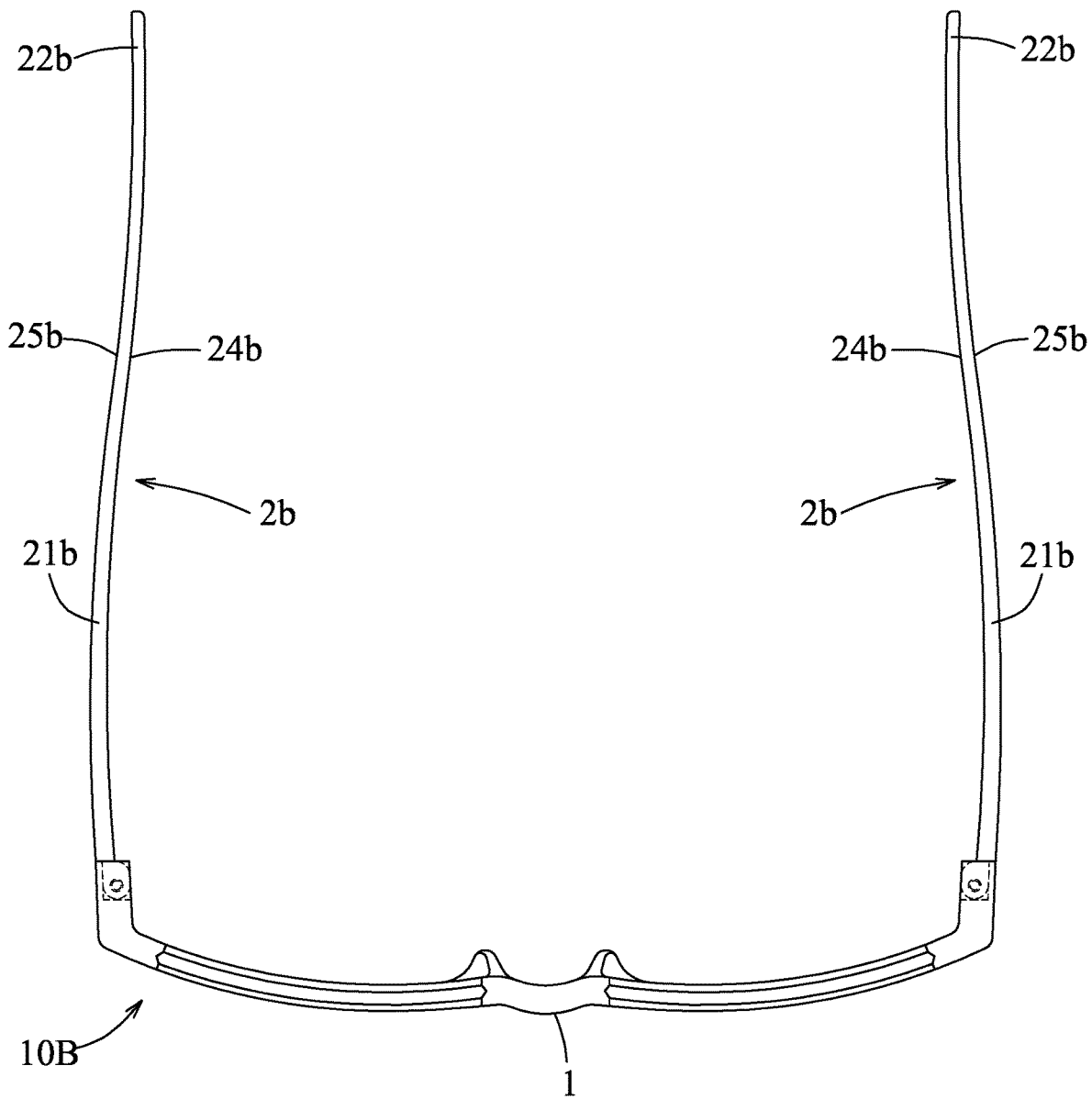
FIG. 13 is a schematic top view of the third embodiment, illustrating that the two temples are in an outwardly curved state.
Figure 14:
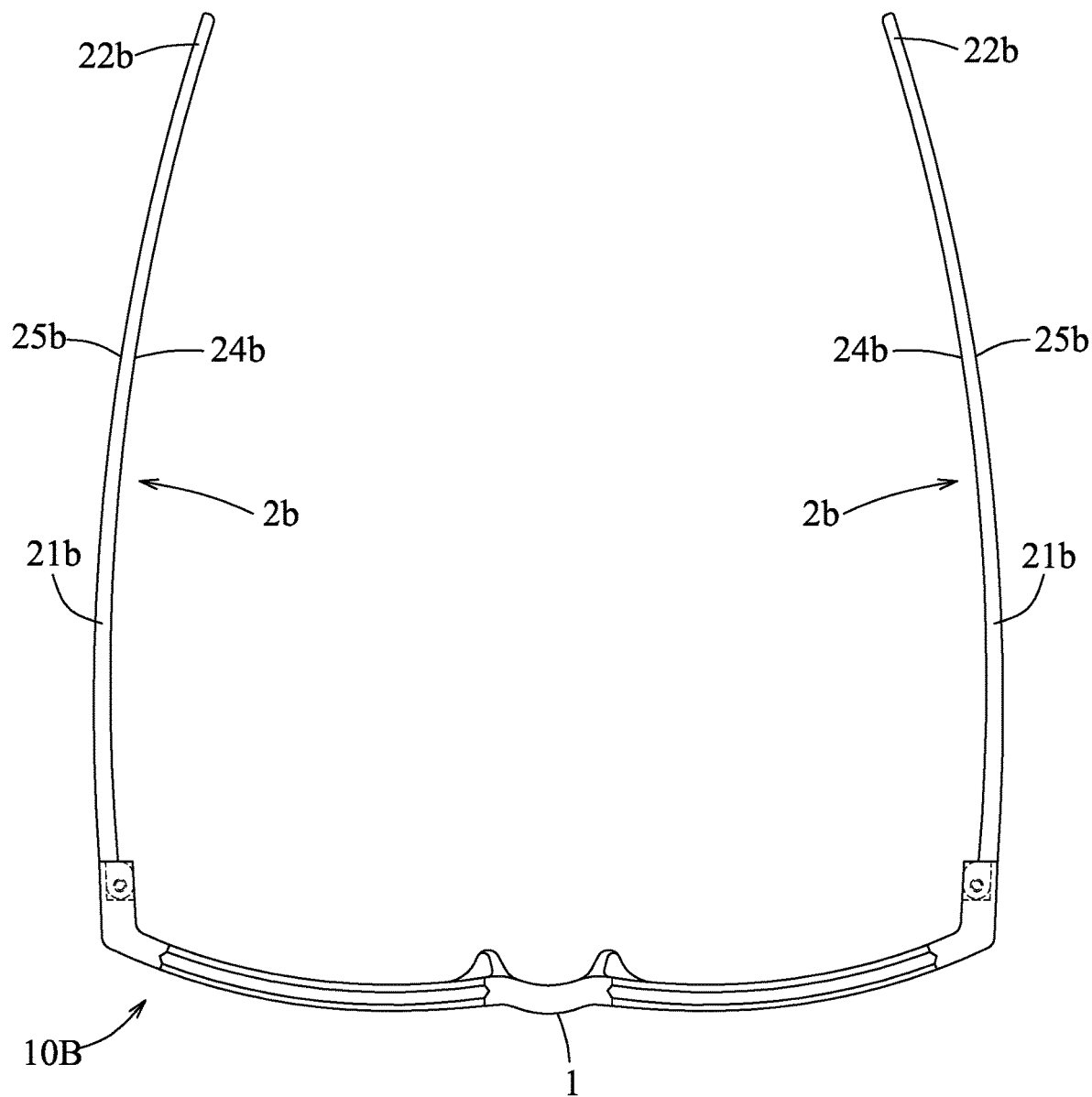
FIG. 14 is a schematic top view of the third embodiment, illustrating that the two temples are in an inwardly curved state.

Referring to FIGS. 12 to 14, in which a third embodiment of the glasses 10B according to the disclosure is shown. The third embodiment is similar to the first embodiment, and includes a glasses frame 1, two lenses 3 mounted on the glasses frame 1, and two temples 2b. Each of the two temples 2b has a horizontal portion 21b, a temple tip portion 22a, an inner side surface 24b, and an outer side surface 25a opposite to the inner side surface 24b. The third embodiment is different from the first and second embodiments in that each of the two temples 2b has two openings 23b that are respectively formed in the horizontal portion 21b and the temple tip portion 22b. Therefore, both the horizontal portion 21b and the temple tip portion 22b are bendable manually to convert between an outwardly curved structure and an inwardly curved structure. In the third embodiment, because both the horizontal portion 21b and the temple tip portion 22b are manually bendable, the user may adopt a two-stage conversion or a single-stage conversion when putting on the eyeglasses 10 depending on their own preference.

Figure 15:
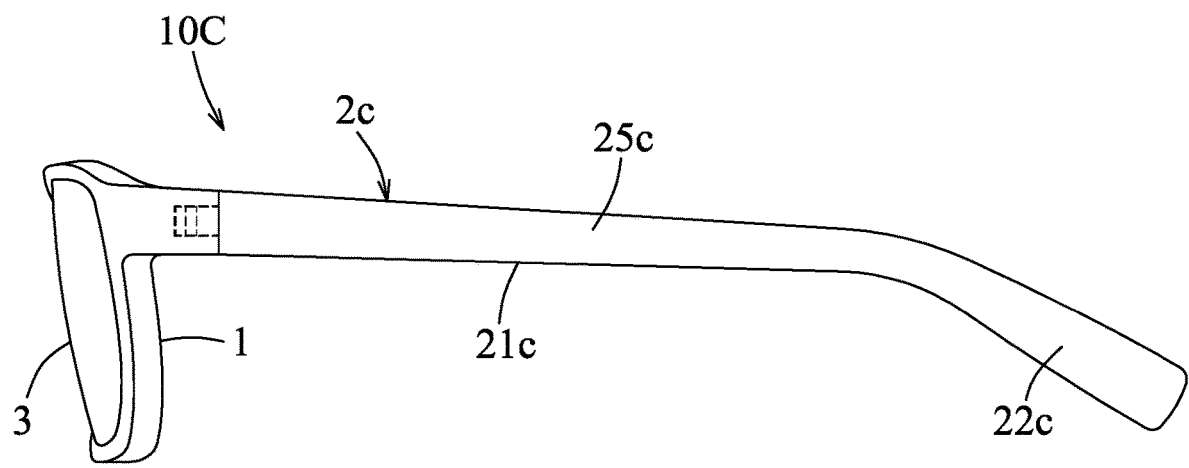
FIG. 15 is a schematic side view illustrating a fourth embodiment of the eyeglasses according to the present disclosure.
Figure 16:
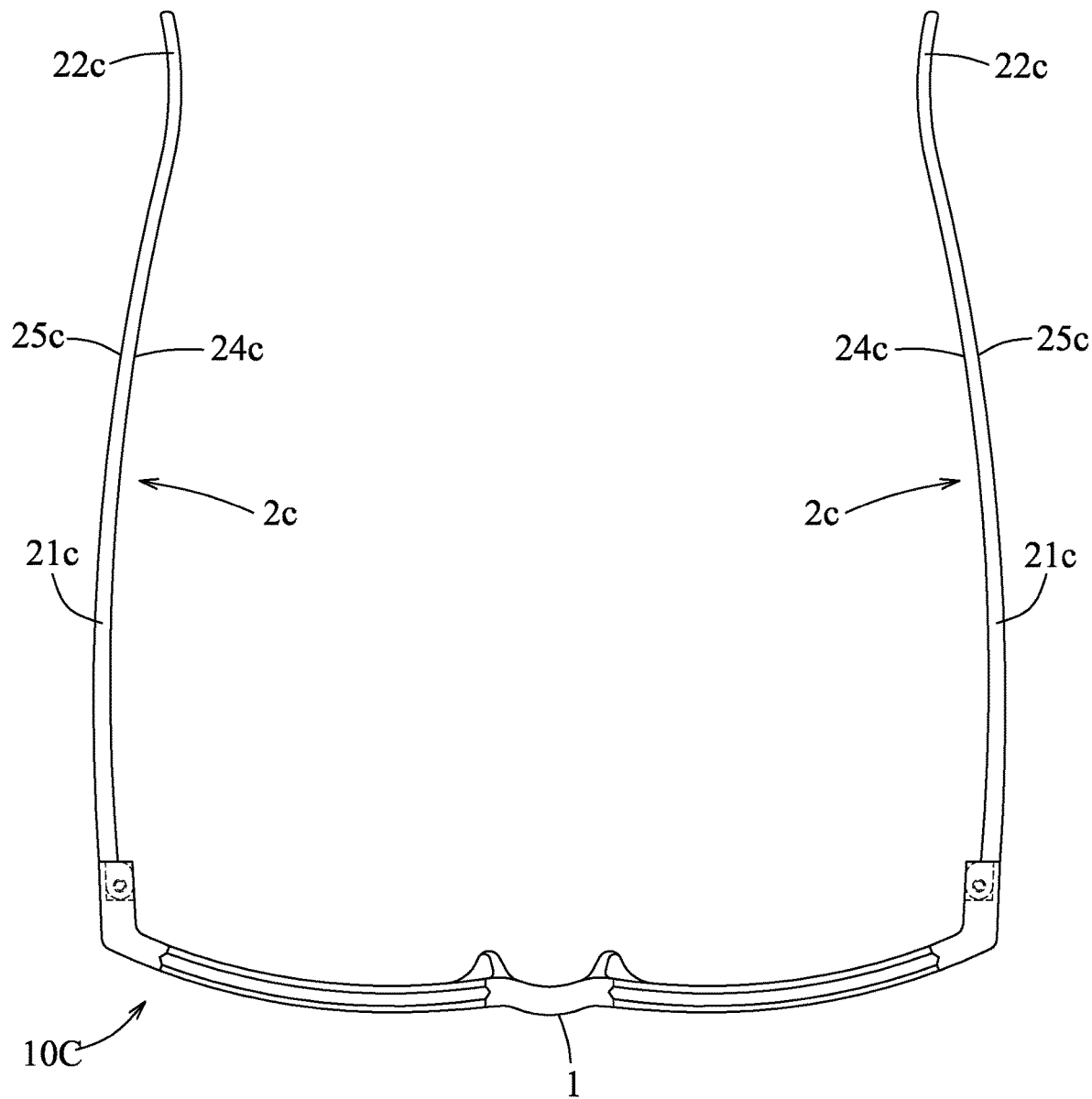
FIG. 16 is a schematic top view of the fourth embodiment, illustrating that the two temples are in an outwardly curved state.
Figure 17:
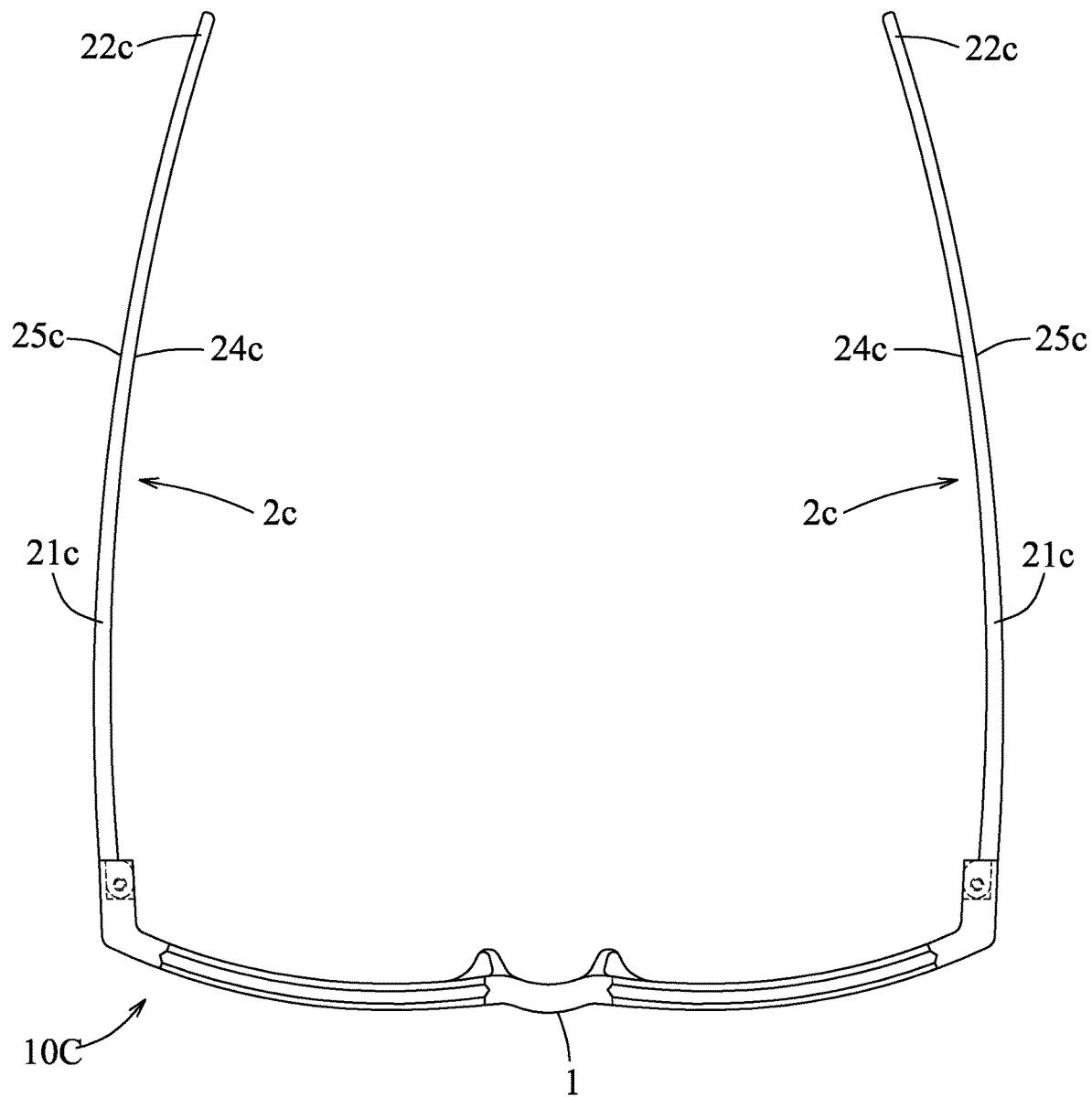
FIG. 17 is a schematic top view of the fourth embodiment, illustrating that the two temples are in an inwardly curved state.

Referring to FIGS. 15 to 17, in which a fourth embodiment of the eyeglasses 10C is shown. The fourth embodiment is similar to the first embodiment in that it includes a glasses frame 1, two lenses 3 mounted on the glasses frame 1, and two temples 2c. Each of the two temples 2c has a horizontal portion 21c, a temple tip portion 22c, an inner side surface 24c, and an outer side surface 25c opposite to the inner side surface 24c. The fourth embodiment is different from the preceding embodiments in that the two temples 2c do not have any openings 23. However, despite this difference, the temple tip portion 22c is still bendable manually to convert between an outwardly curved structure and an inwardly curved structure. Only in this case, the user may need to apply a greater force in order to execute the conversion.

Figure 18:
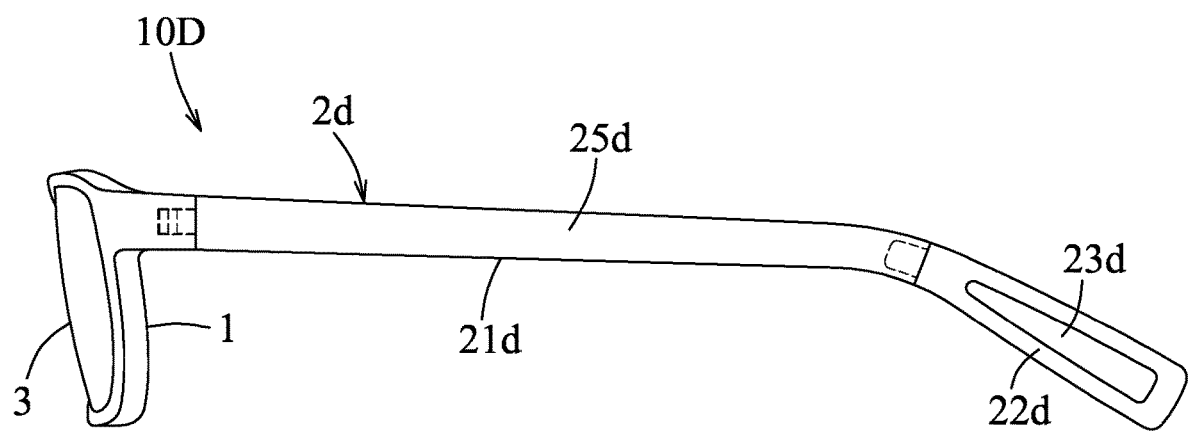
FIG. 18 is a schematic side view illustrating a fifth embodiment of the eyeglasses according to the present disclosure.
Figure 19:
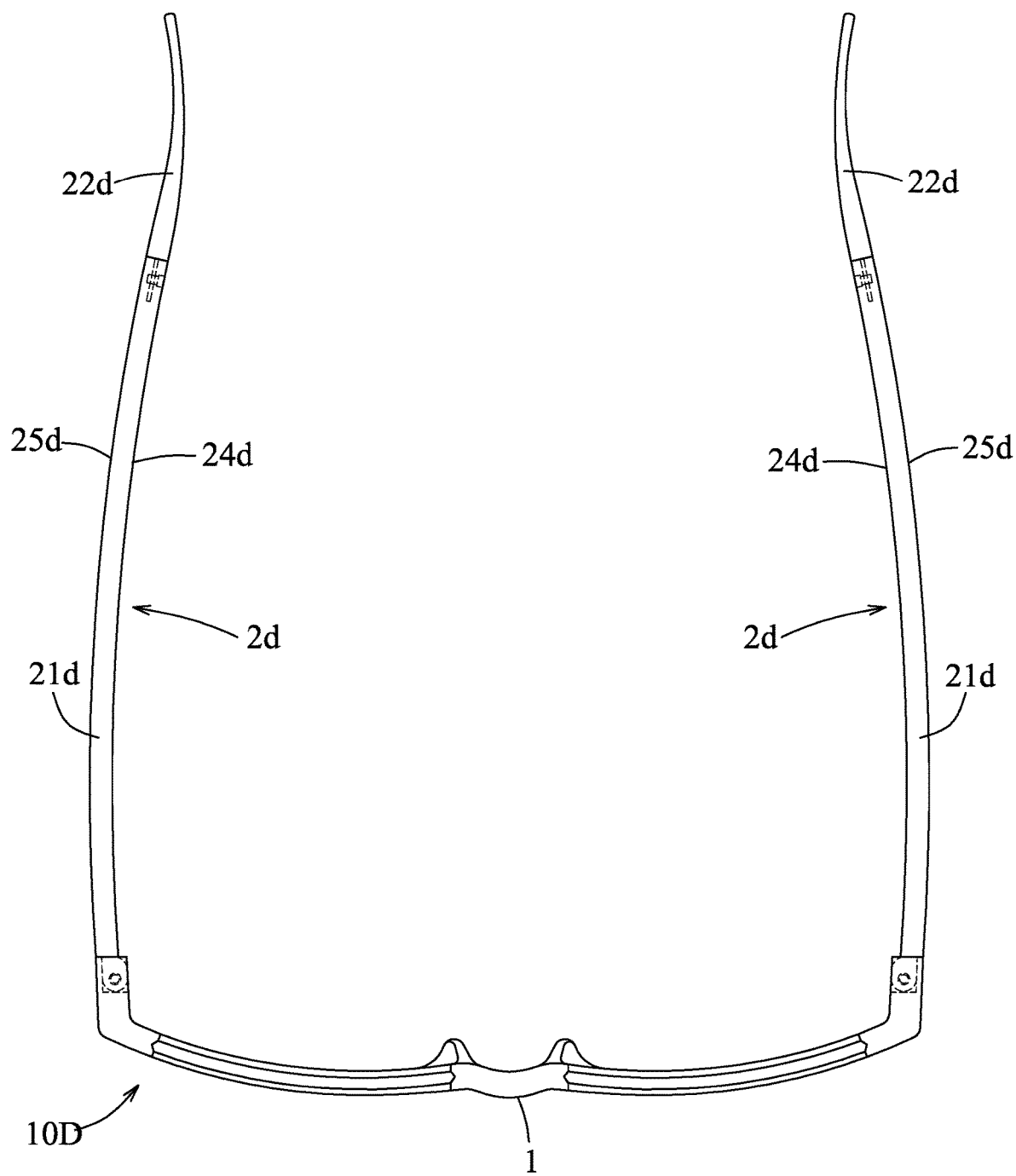
FIG. 19 is a schematic top view of the fifth embodiment, illustrating that the two temples are in an outwardly curved state.
Figure 20:
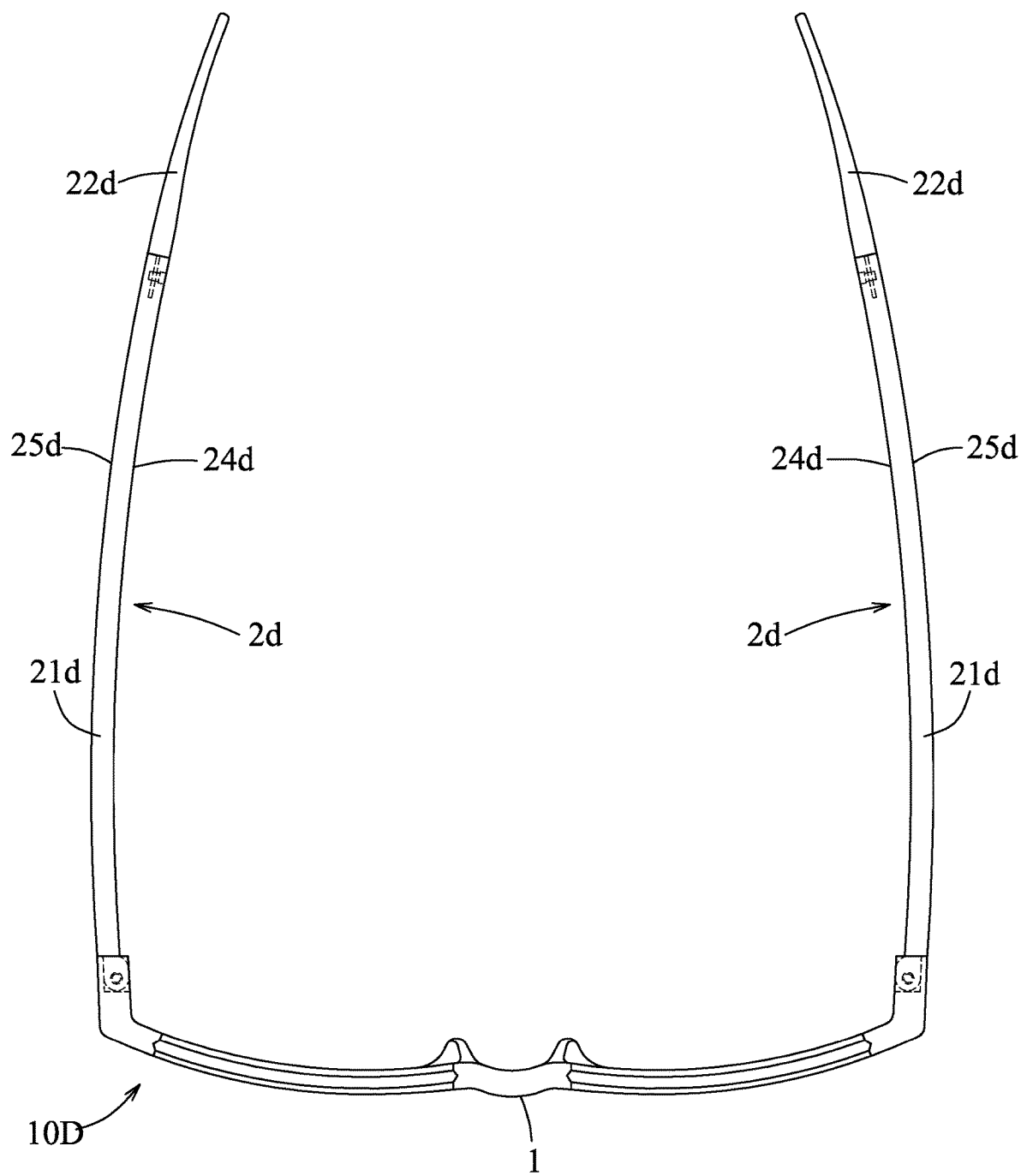
FIG. 20 is a schematic top view of the fifth embodiment, illustrating that where the two temples are in an inwardly curved state.

Referring to FIGS. 18 to 20, in which a fifth embodiment of the eyeglasses 10D according to the disclosure is shown. The fifth embodiment is similar to the first embodiment in that it includes a glasses frame 1, two lenses 3 mounted on the glasses frame 1, and two temples 2d. Each of the two temples 2d has a horizontal portion 21d, a temple tip portion 22d, an inner side surface 24d, and an outer side surface 25d opposite to the inner side surface 24d. The fifth embodiment is different in that for each of the two temples 2d, the temple tip portion 22d is detachably connected to the horizontal portion 21d. Each of the two temples 2d are therefore not integrally formed. In this embodiment, one of the horizontal portion 21d and the temple portion 22d of each of the two temples 2d is made of a metal material, and the other is made of a plastic material.

Figure 21:
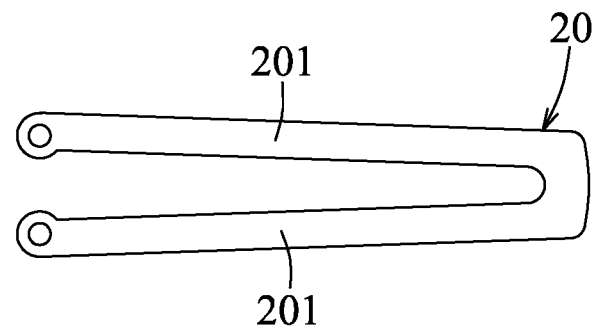
FIGS. 21 to 25 are fragmentary top views illustrating variations of a temple tip portion of the fifth embodiment.
Figure 22:
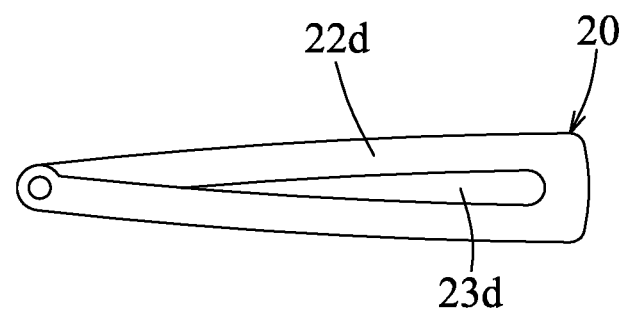

Referring to FIGS. 21 and 22, in this embodiment, the temple tip portion 22d of each of the two temples 21d is made from a semi-finished clip 20. The semi-finished clip 20 has two extension arms 201 that may be welded or screw-locked together to form the temple tip portion 22d. In this embodiment, the temple tip portions 22d are made of a metal material, and the horizontal portions 21d is made of a plastic material.

Figure 23:
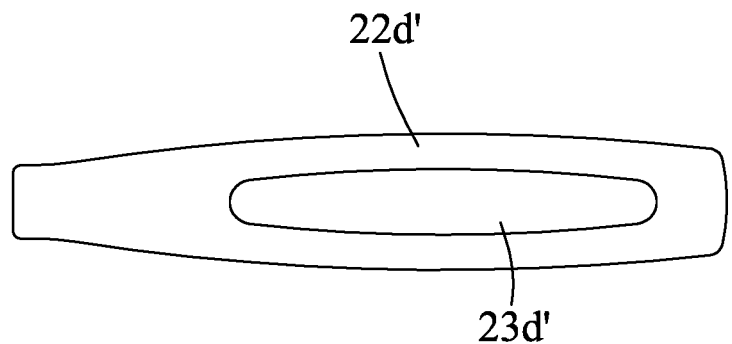
Figure 24:
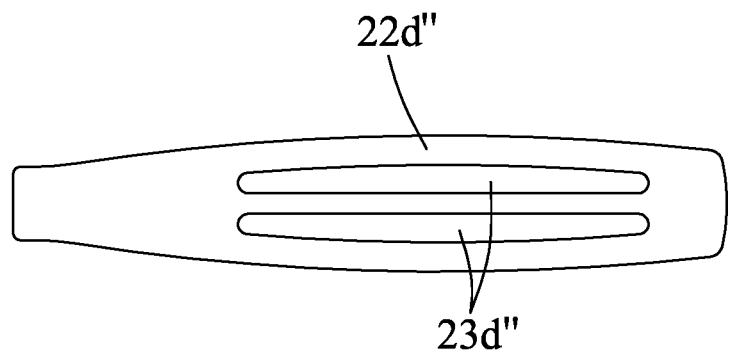
Figure 25:
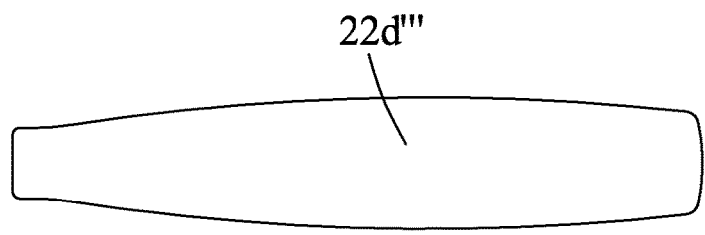

Referring to FIG. 23, showing a first variation of the fifth embodiment, in which the temple tip portion 22d' has one opening 23d' and is either made from stamped metal or injection molded plastic. FIG. 24 shows a second variation of the fifth embodiment, in which the temple tip portion 22d" has two openings 23d". In other variations of the embodiment, each of the two temples 2 has a plurality of openings 23 that are formed in the temple tip portion 22, such that these openings 23 are formed as circular pores, so that the temple tip portion 22 has a mesh or porous structure (not shown). FIG. 25 shows a third variation of the fifth embodiment, in which the temple tip portion 22'" is made of stamped metal or injection molded plastic, and does not have any openings 23.

Figure 26:
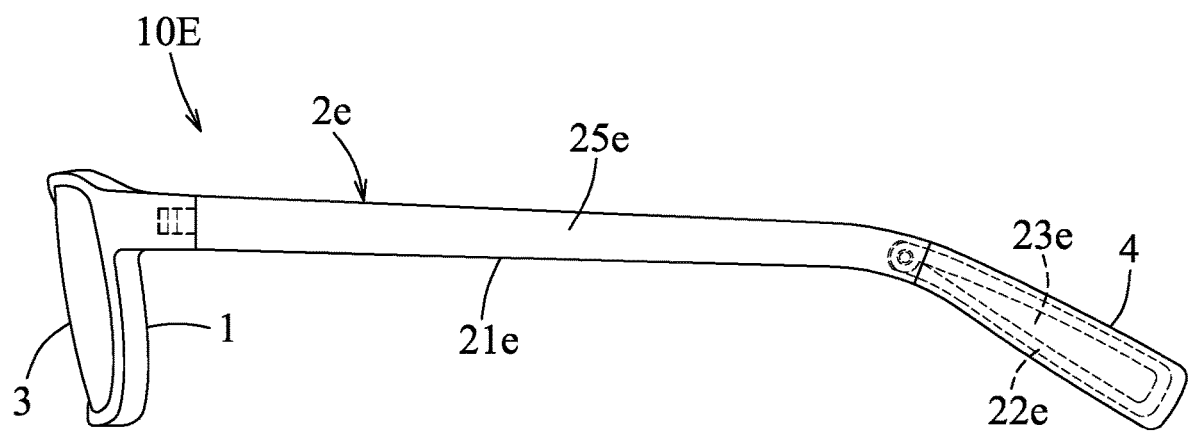
FIG. 26 is a schematic side view illustrating a sixth embodiment of the eyeglasses according to the present disclosure.
Figure 27:
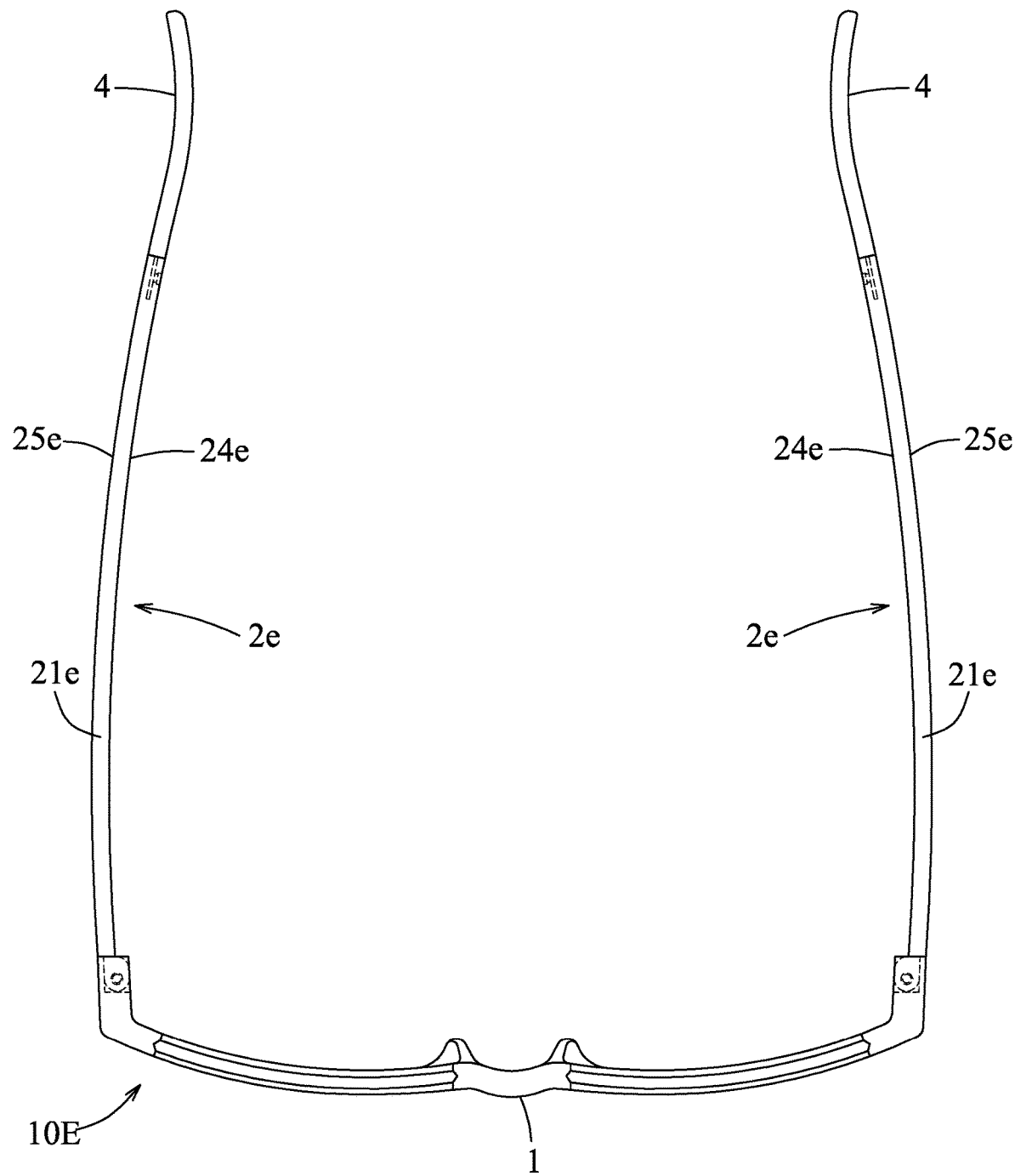
FIG. 27 is a schematic top view of the sixth embodiment, illustrating that the two temples are in an outwardly curved state.
Figure 28:
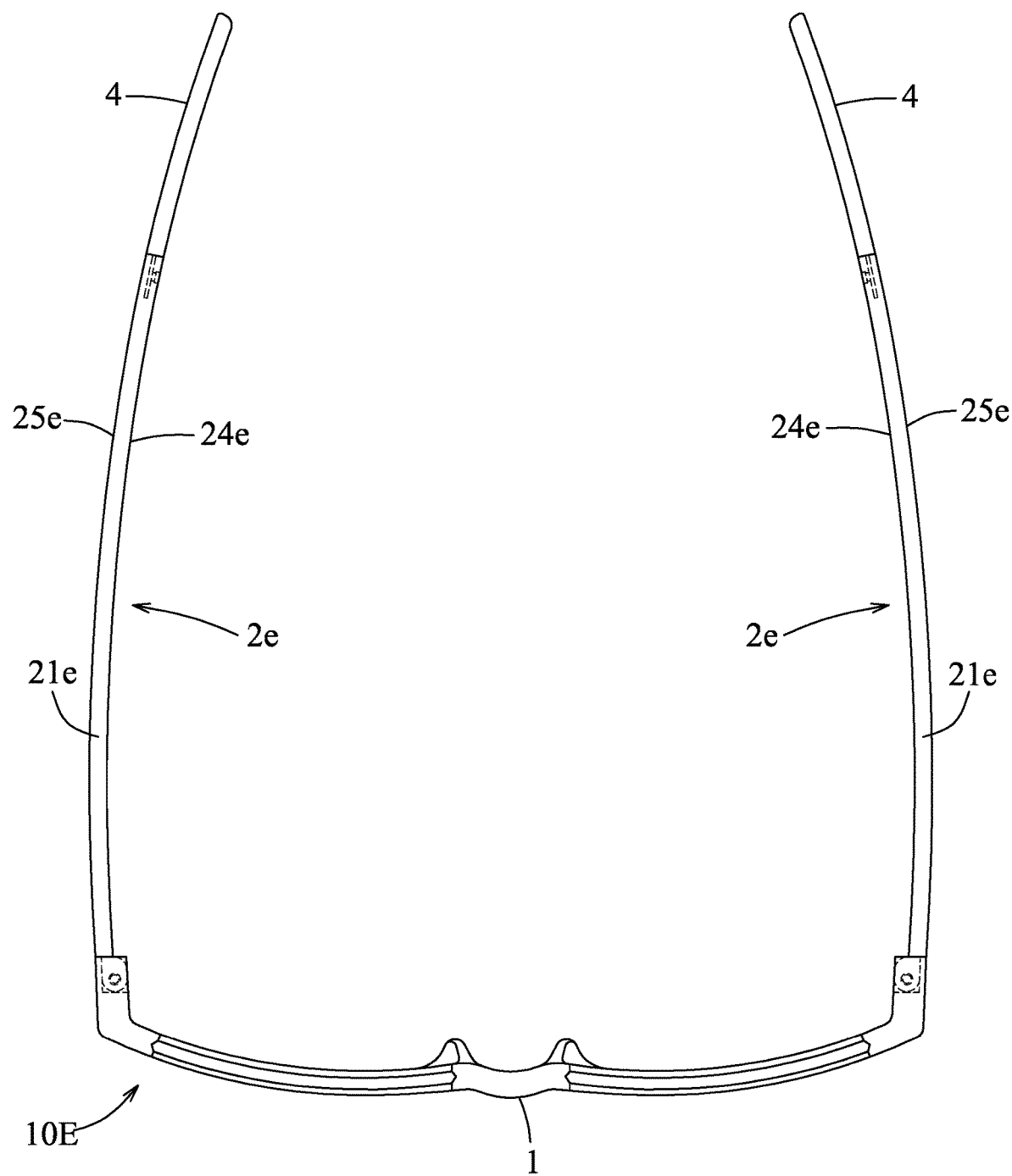
FIG. 28 is a schematic top view of the sixth embodiment, illustrating that the two temples are in an inwardly curved state.

Referring to FIGS. 26 to 28, a sixth embodiment of the eyeglasses 10E according to the present disclosure is shown. The sixth embodiment is similar to the fifth embodiment in that it includes a glasses frame 1, two lenses 3 mounted on the glasses frame 1, and two temples 2e. Each of the two temples 2e has a horizontal portion 21e, a temple tip portion 22e, an opening 23e, an inner side surface 24e, and an outer side surface 25e opposite to the inner side surface 24e. The sixth embodiment is different from the other embodiments in that the eyeglasses 10E further includes two temple tip covers 4 respectively sleeved over the temple tip portions 22e of the two temples 2e. The two temple tip covers 4 are made of a rubber material that is comfortable for the user to wear and has the added benefit of being anti-slip. The temple tip portion 22e is bendable manually to convert between an outwardly curved structure and an inwardly curved structure; the eyeglasses 10E of the sixth embodiment has the same function as the preceding embodiments. It should be noted that in the pair of eyeglasses 10 according to the present disclosure, the openings 23 are incorporated into the structure of the two temples 2 so that the flexibility of the two temples 2 may be adjusted. Users may prefer a stronger or a weaker action when manually converting the temples 2; therefore, different designs for the temples 2 may vary the amount and position of the openings 23 to cater to user preferences for a stronger or weaker action.

In summary of the above, by virtue of the temples 2, 2a, 2b, 2c, 2d, 2e being convertible between an outwardly curved state where rear ends of the two temples 2, 2a, 2b, 2c, 2d, 2e are spaced apart from each other at a first distance (h1), and an inwardly curved state where the rear ends of the two temples 2, 2a, 2b, 2c, 2d, 2e are spaced apart from each other at a second distance (h2) that is smaller than the first distance (h1), the user may first put on the eyeglasses 10, 10A, 10B, 10C, 10D, 10E and then manually tap the temples 2, 2a, 2b, 2c, 2d, 2e to convert the temples 2, 2a, 2b, 2c, 2d, 2e from the outwardly curved state to the inwardly curved state so that the temples 2, 2a, 2b, 2c, 2d, 2e better conform to the shape of the user's head. Therefore, situations such as the eyeglasses 10, 10A, 10B, 10C, 10D, 10E sliding off the user's face or wobbling while being worn may be prevented, and the eyeglasses 10, 10A, 10B, 10C, 10D, 10E may be worn more stably.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A pair of eyeglasses, comprising:
a glasses frame having two opposite ends that are opposite to each other in a left-right direction, and
two temples each having a front end connected pivotally to a respective one of said two opposite ends of said glasses frame, and each extending rearwardly in a front-rear direction that is transverse to the left-right direction;
wherein at least one portion of each of said two temples is flexible so that, by applying lateral forces to said two temples, said temples are convertible between an outwardly curved state where rear ends of said two temples are spaced apart from each other in the left-right direction at a first distance, and an inwardly curved state where said rear ends of said two temples are spaced apart from each other in the left-right direction at a second distance that is smaller than said first distance;
wherein each of said two temples is a single layered structure, and further has an inner side surface and an outer side surface opposite to said inner side surface;
when said two temples are in the outwardly curved state, for each of said two temples, said inner side surface is curved towards said outer side surface when viewed from a widthwise cross-section of said each of said two temples perpendicular to the front-rear direction, and when said two temples are in the inwardly curved state, for each of said two temples, said outer side surface is curved toward said inner side surface when viewed from the widthwise cross-section of said each of said two temples; and
wherein, for each of said two temples, said inner side surface has a degree of curvature that is the same as a degree of curvature of said outer side surface on the widthwise cross-section of said each of said two temples.

2. The eyeglasses as claimed in claim 1, wherein:
each of said two temples has a horizontal portion that has said front end, that is connected to said glasses frame, and that extends rearwardly from said glasses frame, and a temple tip portion that is connected to said horizontal portion and that extends rearwardly from a rear end of said horizontal portion; and
one of said horizontal portion and said temple tip portion is bendable manually to convert between an outwardly curved structure and an inwardly curved structure.

3. The eyeglasses as claimed in claim 2, wherein each of the two temples further has an opening that is formed in one of the horizontal portion and the temple tip portion thereof.

4. The eyeglasses as claimed in claim 2, wherein each of the two temples further has a plurality of openings that are formed in said temple tip portion.

5. The eyeglasses as claimed in claim 2, wherein:
said two temples are made of at least one of a metal material and a unitary plastic material.

6. The eyeglasses as claimed in claim 2, wherein, for each of said two temples, said temple tip portion is detachably connected to said horizontal portion.

7. The eyeglasses as claimed in claim 6, wherein one of said horizontal portion and said temple tip portion of each of said two temples is made of a metal material, and the other is made of a plastic material.

8. The eyeglasses as claimed in claim 6, further comprising two temple tip covers respectively sleeved over said temple tip portions of said two temples.

9. The eyeglasses as claimed in claim 6, wherein each of the two temples further has at least one opening that is formed in said temple tip portion.

* * * * *